March 9, 1954 R. D. BREW 2,671,746

BONDING SYSTEM

Filed June 17, 1950

Inventor
Richard D. Brew
by Roberts, Cushman & Grover
att'ys.

Patented Mar. 9, 1954 2,671,746

UNITED STATES PATENT OFFICE 2,671,746

BONDING SYSTEM

Richard D. Brew, Belmont, Mass., assignor to Richard D. Brew & Company, Inc., Belmont, Mass., a corporation of Massachusetts Application June 17, 1950, Serial No. 168,703

5 Claims. (Cl. 154—128)

The joining of bodies for use in precision apparatus for various purposes presents considerable difficulty, especially as to strength, exact correlation of the surfaces to be joined, physical properties required by the purpose, and feasibility of execution under at least fairly economical commercial volume production conditions. It is particularly difficult to join surfaces of quartz, mica, glass, ceramic and other dielectric bodies to metal, or to similar surfaces of dielectric material. It has been proposed to use intermediate auxiliary layers for the purpose, by way of painting dielectric surfaces with metal (for example silver) paint, by firing these paints and by then soldering these metal layers. Such bonding has proved to be unsatisfactory for certain purposes, because it cannot be controlled as to dimensions, is not very strong, and does not perform well over wide temperature ranges. These defects are particularly felt in some applications requiring bonds of high quality in every respect, as for example delay lines which are expected to operate safely within a temperature range of from —50° to +100° C.

Some of the objects of the present invention are to provide joints of the above indicated type which perform well over a wide temperature range even if the temperature coefficients of the two joined bodies are quite different, which are mechanically strong so as to resist separation of the bonded bodies, which have favorable characteristics of ultrasonic transmission with a minimum of attenuation over a wide practical range up to about 60 megacycles, and which are comparatively easy to manufacture with a view to time consumption as well as quality of labor.

With these and other objects in view, I provide, according to my invention, bonds of the above indicated nature by meticulous chemical cleaning, according to standard optical practice, dielectric or other surfaces which are geometrically substantially congruent according to the highest known standards; by evaporation coating each surface with a metal of high ductility as well as coherence (providing high affinity for another similar surface), these coatings being throughout maintained meticulously clean and even without splattering or other surface distortion, and applied in a preferred thickness of about .75 to 25 microns for each side, this thickness being controlled preferably by means of a technique which constitutes another aspect of the present invention; by roughening both surfaces and immediately thereupon pressing them together, at a pressure above about 1,500 lb. per square inch, the pressure being selected, among other reasons, to avoid crystalizing of the two metal layers. Coatings of pure indium or tin, or as alternatives of alloys such as indium-tin, indium-gallium or indium-gallium-tin, were found satisfactory, provided that all these metals are used in chemically pure state.

In another aspect of my invention, indicated above, I control the thickness of specimen layers applied in vacuo by observing the increasing opacity of a test layer, by virtue of the fact that a certain thickness of the specimen layer (which may be greater than that of the control layer) is a function of the threshold opacity of the test layer and the ratio of the distance of specimen and test surfaces from the source of light and that of evaporating metal.

My invention also embraces a pair of dielectric bodies bonded at geometrically congruent (such as flat) surfaces by thin coatings of metal of maximum coherence and ductility, the bonding region of these coatings being essentially clean and joined substantially only by molecular intermeshing.

Other aspects and features of my invention, in addition to those contained in the above statement of the nature and substance thereof including some of its objects, will appear from the following description of a typical embodiment illustrating its novel characteristics as defined in the appended claims.

The description refers to drawings in which

The practical embodiment now to be described deals with the bonding or fusing of three quartz bodies, such as the fused quartz block and the crystal end plates of an ultrasonic delay line of known construction.

The surfaces to be bonded, in the present embodiment initially an end surface of each one of a batch of for example six blocks and a surface of each of six plates, are first rendered chemically clean in accordance with highest optical standards required for coating and similar purposes. Since techniques for this cleaning step are well known in the art they need not be described in detail. The second set of surfaces of the same batch may be cleaned at the same time, but I prefer to clean each set directly before the coating step.

Figure 1:
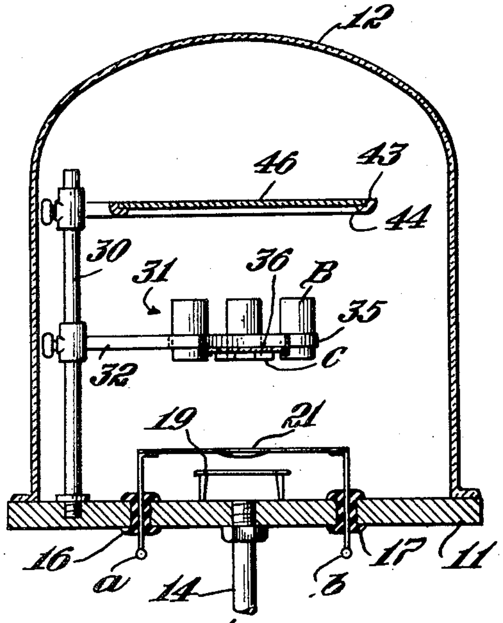
Fig. 1 is a vertical sectional view, partly in elevation, showing apparatus which permits carrying out the method according to the present invention.
Figure 3:
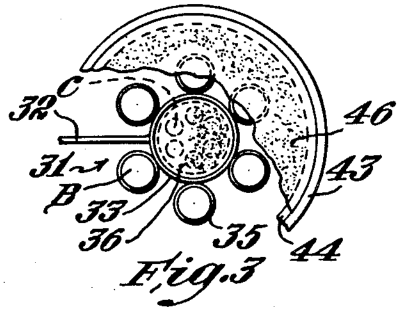
Fig. 3 is a top view, partly broken away, of the specimen and control bodies during coating.
Figure 2:
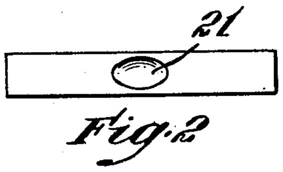
Fig. 2 is a top view of the evaporation boat.
Figure 4:
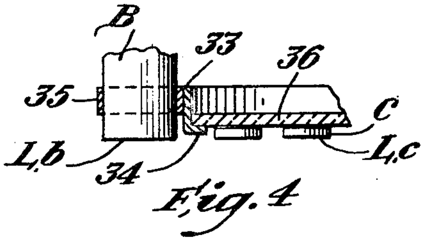
Fig. 4 is a fragmentary sectional view, partly in elevation, showing specimen coated according to the invention, mounted on their holder.

The cleaned blocks and plates are then placed within the bell of conventional evaporation coating apparatus as schematically shown in Fig. 1. In this figure, 11 indicates the base for bell 12, the base having conduit 14 leading to appropriate conventional evacuation apparatus, and two insulated leads 16 and 17 with terminals *a*, *b* for connection to an appropriate source of electric energy. A shield 19 protects the exhaust conduit. Supported on the electrical leads is a molybdenum boat 21 (Fig. 2) of standard construction which can be heated with electric current supply at *a*, *b*. A supporting column 30 is fastened to base 11 in any convenient manner. The specimens to be coated are supported on a holder 31 adjustably fastened at 32 to column 30. This holder has, fastened to rod 32, a ring 33 with rim 34 and, brazed to 33, a set of six smaller rings or sleeves 35. Rim 34 supports a glass plate 36 to which the crystal plates C are waxed in known manner as shown in Figs. 3 and 4. The fused bodies B are frictionally held in sleeves 35. The surfaces of specimens B and C are approximately within a plane. A further ring 43 with rim 44 is fastened to stand 30, for the control plate 46 to be described in detail below.

In the boat 21 is placed an appropriate amount of chemically (99.975%) pure indium powder. About 5.2 grams of powder are required per $cm.^2$ of surface to be coated which approximate figure includes a surplus metal charge for the purpose of avoiding the evaporation of slag. The metal evaporates first so that the coating can be finished before slag remaining in the boat is likewise evaporated. This surplus charge should just be enough to provide metal for the inevitable slag formation, and for holding the slag during the final evaporation period, as above indicated.

Evaporation is performed at minimum temperature in order to avoid boiling which causes splattering and transfer of metal droplets to the surfaces to be coated, which would correspond to a spraying instead of an evaporation coating technique.

This critical temperature can be obtained in conventional manner by gradually increasing the current until proper evaporation prevails.

Evaporation is continued until a coating of a thickness of between approximately .75 to 1.25 microns is deposited. Both surfaces to be joined should be covered with layers $Lb$, $Lc$ of the same thickness and for that purpose and also in order to provide identical molecular structures for both bonding layers, they have to be coated simultaneously as herein described, in order to furnish best results. These dimensions are at the same time very favorable as to transmission of ultrasonic energy.

I found that for present purposes, the thickness of the coatings can be conveniently determined as follows.

The above mentioned control plate 46 (Figs. 1, 3 and 4) of transparent material similar to that of plate 36, is adjusted in a position relatively to the boat so as to permit simultaneous coating as well as observation of the test surface and of a specimen surface in transmitted light from the molten metal in boat 21. The transparencies of specimen and control coatings are functions of the respective thicknesses and hence of the ratio $d/D$ (Fig. 5) of distances from the source of evaporating material and the ratio of distances from a light source, which can be the same in the present instance. A certain specimen layer thickness corresponds to the threshold opacity value of the control layer $Lt$ (Fig. 5), that is the value corresponding to disappearance of the light source observed through the control surface. This value can be determined with considerable accuracy. If, as in the present instance, the desired specimen layer thickness is greater than its opacity threshold layer, the control surface is placed at a greater distance. The threshold opacity of the test surface is experimentally calibrated in terms of distances and specimen layer thickness, which calibration is simplified if, as in the present instance, the source of deposit is incandescent during the critical period and can be used as test light. By continuously checking the test surface, a definite specimen thickness can be determined within the range of .1 to 10 microns by stopping evaporation when the test surface turns opaque which, by way of previous calibration, indicates a given thickness of the specimen layer as determined by the above mentioned distance ratio which can be changed by varying one or both distances, thus setting a standard for the desired specimen layer thickness.

The specimens are then removed from the bell, and then cleaned and at the same time roughened by wiping them with a swab of clean absorbent cotton on a glass rod.

Figure 6:
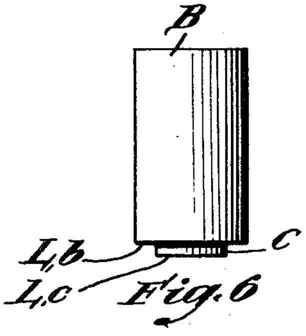
Fig. 6 is an elevation of two specimens joined by hand pressure.

Immediately upon being swabbed, the specimens are contacted with slight pressure such as can be manually exerted, and they will adhere to each other as indicated in Fig. 6.

A set of six plates C is then applied to plate 36, the blocks B are reinserted in holders 35, the above described coating step is repeated, and the plates C contacted with the so far free although now coated ends of bodies B.

Figures 5, 7:
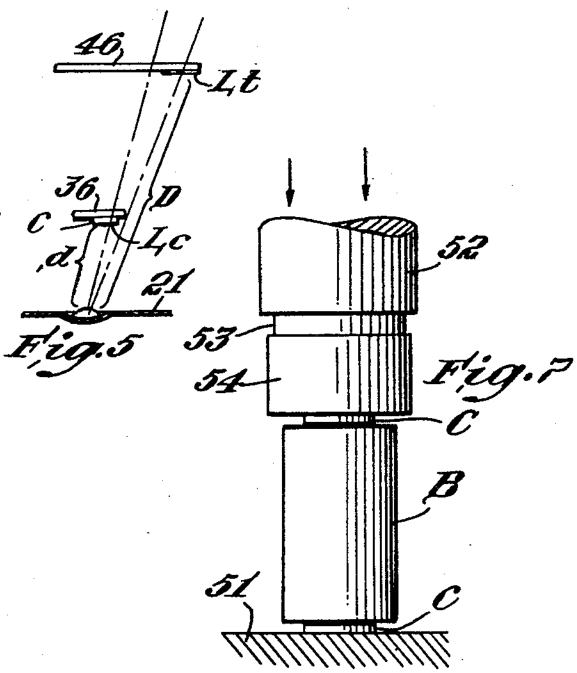
Fig. 5 is a diagram illustrating control of deposit thickness.
Fig. 7 is a diagram indicating the final, pressurable bonding of the four surfaces of a delay line, according to the invention.

Each specimen unit of one block B and two plates C is then inserted between plate 51 and movable member 52 of a conventional press, as indicated in Fig. 7. A rubber plate 53 is preferably inserted as a cushion between 52 and a steel black 54. The contact surfaces of 51 and 54 are optical flats. A pressure of not less than 1,500 lbs. per square inch should be used; approximately 3,500 pounds per square inch was applied in the above described embodiment.

Instead of coating with pure indium as above described other metals or alloys of maximum coherence as well as ductility can be used, such as pure indium with gallium (1% to 3%) or tin (1% to 5%), or tin with gallium (4%). All metals should be of highest obtainable purity.

The bond thus formed conforms to all initially mentioned requirements, probably due to the fact that under the above conditions the molecules interlock at room temperature. I found particularly that this bond withstands unequal specimen expansion with temperature change, which is probably due to the fact that the molecular interlock of the highly ductile bonding material compensates for the unequal specimen expansion. I also found that bonds formed as above described have particularly favorable attenuation characteristics for ultrasonic energy, over a wide temperature and frequency range.

It should be understood that the present disclosure is for the purpose of illustration only and that this invention includes all modifications and equivalents which fall within the scope of the appended claims.

I claim:

1. The method of mechanically and electromagnetically bonding geometrically substantially congruent surfaces of two bodies, which comprises the steps of chemically cleaning said surfaces, simultaneously evaporating in vacuo on each of said surfaces an indium coating, each coating having a thickness of the order of 0.5 to 25 microns, and joining said bodies at ordinary temperature solely by forcing said coatings together under a pressure of not less than approximately 1,500 lbs. per square inch; whereby an intermolecular bond is formed which will transmit ultrasonic energy under extreme temperature variations.

2. The method of mechanically and electromagnetically bonding geometrically substantially congruent surfaces of two bodies, which comprises the steps of chemically cleaning said surfaces, simultaneously evaporating in vacuo on each of said surfaces a chemically substantially pure indium coating of a thickness of the order of 0.5 to 25 microns, roughening said coatings by superficial wiping with chemically clean fibrous material, contacting said coatings under slight pressure, and joining said bodies at ordinary temperature solely by forcing said coatings together under a pressure of not less than approximately 1,500 lbs. per square inch; whereby an intermolecular bond is formed which will transmit ultrasonic energy under extreme temperature variations.

3. The method of mechanically and electromagnetically bonding quartz bodies having geometrically congruent surfaces which comprises the steps of chemically cleaning said surfaces, simultaneously evaporating in vacuo on each of said surfaces a coating of a ductile metal selected from the group consisting of indium, tin, indium-tin alloy, indium-gallium alloy, and indium-tin-gallium alloy, each coating having a thickness of the order of 0.5 to 25 microns, and joining said bodies at ordinary temperature solely by forcing said coatings together under a pressure of not less than approximately 1,500 pounds per square inch, whereby an intermolecular bond is formed which will transmit ultrasonic energy under extreme temperature variations with minimum attenuation.

4. The method of mechanically and electromagnetically joining two dielectric bodies face to face which comprises coating the face of each dielectric body with a ductile metal selected from the group consisting of indium, tin, indium-tin alloy, indium-gallium alloy, and indium-tin-gallium alloy to a thickness of not less than 0.5 micron, maintaining said bodies and coating at ordinary temperature, and forcing the coated faces together while at said ordinary temperature with a pressure not less than about 1500 pounds per square inch thereby to form a strong intermolecular bond between said faces which is substantially unaffected electromagnetically or mechanically by wide temperature changes.

5. An electrical device comprising two dielectric bodies having geometrically substantially congruent surfaces, like layers of ductile metal approximately 0.5 to 25 microns thick adjacent and bonded to said surfaces respectively, said ductile metal being selected from the group consisting of indium, tin, indium-tin-alloy, indium-gallium alloy, and indium-tin-gallium alloy, and an interfacial bonding zone of intermolecular meshing between said like layers, spaced from said surfaces and substantially free of thermal stress at ordinary temperature.

RICHARD D. BREW.

References Cited in the file of this patent

UNITED STATES PATENTS

| Number | Name | Date |
|---|---|---|
| 1,873,776 | McNeil et al. | Aug. 23, 1932 |
| 2,130,879 | Dobke | Sept. 20, 1938 |
| 2,139,431 | Vatter | Dec. 6, 1938 |
| 2,239,452 | Williams et al. | Apr. 22, 1941 |
| 2,275,952 | Freeman | Mar. 10, 1942 |
| 2,281,280 | Gabor | Apr. 28, 1942 |
| 2,283,705 | Stewart | May 19, 1942 |
| 2,480,453 | Dorgelo | Aug. 30, 1949 |
| 2,544,320 | Hurd | Mar. 6, 1951 |
| 2,557,983 | Linder | June 26, 1951 |

OTHER REFERENCES

Indium, Scientific American, pp. 154, 155, 156 of April 1944.